United States Patent
Craig et al.

[11] Patent Number: 5,835,795
[45] Date of Patent: Nov. 10, 1998

[54] BLENDED PHOTOGRAPHIC COMPOSITE IMAGES

[75] Inventors: Robert Lee Craig, Pfafftown, N.C.; Stephen J. Weitz, Boca Raton, Fla.; John W. Spencer, Boyue City, Mich.

[73] Assignee: Photo Dimensions, Winston-Salem, N.C.

[21] Appl. No.: 800,348

[22] Filed: Feb. 14, 1997

Related U.S. Application Data

[63] Continuation-in-part of Ser. No. 670,352, Jun. 25, 1996, Pat. No. 5,615,396.

[51] Int. Cl.$^6$ .............................. G03B 1/00; G03B 11/00; G03B 17/02; G03B 17/24
[52] U.S. Cl. .............................. 396/6; 396/322; 396/535; 396/545
[58] Field of Search .............................. 396/6, 310, 315, 396/316, 317, 318, 322, 335, 535, 545, 429; 352/90; 355/39, 40; 430/333, 396, 496

[56] References Cited

U.S. PATENT DOCUMENTS

| | | | |
|---|---|---|---|
| 360,314 | 3/1887 | Lewis . | |
| 547,855 | 10/1895 | Lee . | |
| 1,268,609 | 6/1918 | Powell . | |
| 3,665,828 | 5/1972 | Reiter | 95/11 R |
| 3,815,147 | 6/1974 | Wick et al. | 354/203 |
| 3,928,863 | 12/1975 | Stewart et al. | 354/109 |
| 4,268,144 | 5/1981 | Wheeler | 354/108 |
| 4,310,232 | 1/1982 | Reed | 354/125 |
| 4,352,555 | 10/1982 | Dobbs et al. | 355/77 |
| 4,357,102 | 11/1982 | Taren et al. | 355/77 |
| 4,427,279 | 1/1984 | Edelstein et al. | 354/107 |
| 4,652,104 | 3/1987 | Harvey | 354/106 |
| 4,655,570 | 4/1987 | Jaffe | 354/107 |
| 4,707,106 | 11/1987 | Johnson et al. | 354/481 |
| 4,717,930 | 1/1988 | Wheeler | 354/108 |
| 4,764,782 | 8/1988 | Wheeler | 354/109 |
| 4,801,957 | 1/1989 | Vandenmoere | 354/147 |
| 4,816,848 | 3/1989 | Doyle, Jr. | 354/108 |
| 4,827,291 | 5/1989 | Guez | 354/125 |
| 4,894,671 | 1/1990 | Wheeler | 354/108 |
| 4,896,176 | 1/1990 | Barrett | 354/122 |
| 4,942,412 | 7/1990 | Wheeler | 354/125 |
| 4,994,832 | 2/1991 | Spector | 354/110 |
| 5,111,224 | 5/1992 | Spector | 354/125 |
| 5,142,311 | 8/1992 | Olson et al. | 354/120 |
| 5,187,512 | 2/1993 | Kirkendall | 354/120 |
| 5,189,453 | 2/1993 | Boyd | 354/122 |
| 5,189,467 | 2/1993 | Wheeler | 354/110 |
| 5,192,648 | 3/1993 | Burnham | 430/496 |
| 5,247,320 | 9/1993 | Kay | 354/83 |
| 5,343,265 | 8/1994 | Oi et al. | 354/222 |
| 5,425,840 | 6/1995 | Ferrante | 354/106 |
| 5,486,885 | 1/1996 | Matsumoto | 216/83 |
| 5,565,936 | 10/1996 | Kim et al. | 396/340 |

FOREIGN PATENT DOCUMENTS

| | | |
|---|---|---|
| 2321463 | 4/1972 | Japan . |
| 3290643 | 12/1991 | Japan . |
| 2237120 | 4/1991 | United Kingdom . |

*Primary Examiner*—A. A. Mathews
*Attorney, Agent, or Firm*—Merchant, Gould, Smith, Edell, Welter & Schmidt

[57] ABSTRACT

A portion of a frame of film is pre-exposed to a first image by subjecting the film to a low intensity exposure while masking a portion of the film. The film is then used in a conventional camera along with a non-opaque exposure limiting device. The non-opaque exposure limiting device is positioned between the camera lens and the film. During exposure of the film to a second or target image, the first image is partially re-exposed thereby enhancing the stability of the picture while capturing the target image on the unexposed portion of the frame of film. The two images are then developed in a conventional manner to produce a relatively smoothly blended composite photograph.

38 Claims, 7 Drawing Sheets

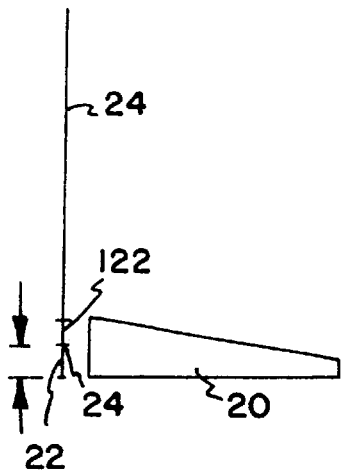
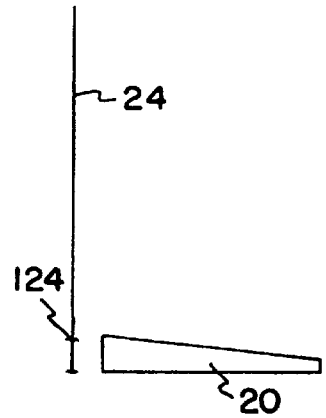
FIG. 6 A  　　　　FIG. 6 B
FIG. 7A　　　　　FIG. 7B
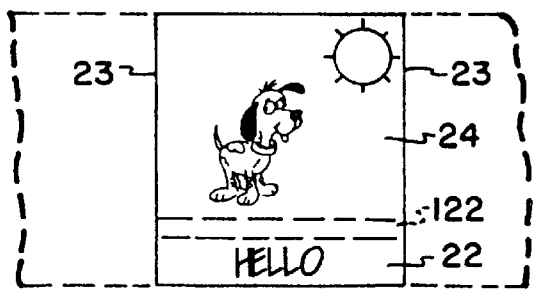
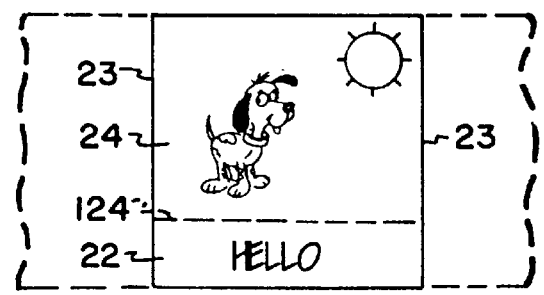

BLENDED PHOTOGRAPHIC COMPOSITE IMAGES

RELATED APPLICATIONS

This application is a continuation-in-part of application Ser. No. 08/670,352 filed Jun. 25, 1996 now U.S. Pat. No. 5,615,396, and the contents thereof are incorporated by reference herein.

BACKGROUND OF THE INVENTION

1. Field of the Invention

This invention relates to making multiple exposure photographic images. In particular the film is subjected to two or more images at different times and then developed simultaneously in a conventional manner.

2. Description of the Prior Art

Several procedures have been developed to create composite photographs by exposing film to multiple images. Techniques for creating composite images have either been aimed at directing two images to different parts of the film during a single exposure or using a system of masking different parts of the film during multiple exposures.

The latter technique involves exposing the film to a first image while masking off a remaining portion of the film. This prevents the remaining portion from being exposed. Prior to exposing the film to a second image, the first exposed portion of the film is masked off in a light-tight manner. Again this prevents re-exposure when the second image is exposed to the unexposed portion of the film. Thus, no single portion of the film is exposed more than once.

The inherent problems with this technique are twofold. First, the periphery of the two images must be strictly aligned. Aligning the two images prevents visible lines from forming between the two images caused by over-exposure or under-exposure of any part of the film. Second, any under-exposure or over-exposure that occurs while taking the second image cannot be easily corrected. Any correction during development could adversely affect either the first or second exposed image. Consequently, the images will not be smoothly blended into a composite image.

SUMMARY OF THE INVENTION

This invention combines two images onto the same frame of a film in a single photograph in a way that minimizes the known problems in the prior art of poor image blending and visible lines of demarcation between images.

This invention utilizes a camera, pre-exposed film and a non-opaque exposure limiting device to uniquely create a composite photograph that more aesthetically blends two images.

Part of each film frame is first exposed to a first image at a reduced exposure while the remaining part of the frame is masked off so that it remains unexposed. The film is then loaded into a camera.

In one form of the invention there is a non-opaque exposure limiting device positioned between the first exposed portion of each frame and the camera's lens. A non-opaque exposure limiting device is a non-opaque element for reducing light intensity preferably between about one and about two fStop. The exposure limiting device reduces the intensity of the exposure the first exposed portion of the film receives when the film is exposed to a second image, namely the target image. Thus, the first image is at least partly re-exposed.

The exposure limiting device does not completely mask the first exposed image as described in the prior art. Instead the exposure limiting device allows sufficient light to further re-expose the first exposed area of the film. The images are then simultaneously developed as a single image.

The exposure limiting device is installed into the exposure aperture frame of a camera in a manner that permits removal. The exposure limiting device may be one or multiple components.

Smooth image blending is possible because the picture is stabilized by subjecting the two images to the same second light source. Thus, an under or over exposure of the second image will cause the same effect in the first exposed image and the corrections to the second image made while exposing the film will necessarily correct both images.

Visible lines of demarcation between the two images are less noticeable because the first exposed image is initially exposed to a low intensity exposure. Thus, if the exposure limiting device is not precisely positioned such that the first exposed portion of the film receives the full intensity while exposing the second image, the effect will be less pronounced than a double exposure at full intensity as occurs in the prior art.

In other forms of the invention there is a system where the exposure limiting device is an opaque element for reducing light intensity.

In a yet further aspect of the invention there is a procedure for creating the length of film for photographic exposure. This film comprises a first exposed area, and an unexposed area for exposure to create from the image, a target image. The unexposed area is the portion of the film not containing the first exposed area thereby to permit the production of film having both the first exposed area and target image.

The preferred invented procedure for creating the first image of a desired art for the first image uses a computer program. The program alters the contrast levels and tonal gradients of an image represented by the art, and an electronic image is obtained on the film representative of the image represented by the art. A developed transparency film is obtained for being a master for creating repetitions of the image as the first exposed image on a length of film. The master is placed on an optical stand through which the length of film is exposed to the image as the first exposed image.

The image is altered to vary the gamma of emulsion layers from a color perspective, and an altered image file is transmitted to a high resolution film recorder.

The optical stand includes masking formed to tolerances of the camera and the optical stand includes a light source of a color temperature that falls in the 5,000 to 5800 degree Kelvin scale.

The invention is directed to the photographic apparatus, camera, the exposure photographic apparatus.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

In order to obtain a fuller and more precise understanding of the nature and design of this invention, reference should be made to the following detailed description taken in connection with the following drawings:

FIG. 6A and 6B are block diagrams illustrating the blending effect of the exposure limiting device;

FIG. 7A and 7B are block diagrams of a frame of film illustrating the blending effect of the exposure limiting device configurations shown in FIG. 6A and 6B, respectively;

DETAILED DESCRIPTION OF THE PREFERRED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The preferred embodiment of this invention produces a relatively smoothly blended composite photograph of two or more images from a conventional camera, a roll of pre-exposed film and a non-opaque exposure limiting device. The first image may be available in a variety of stylized designs including decorative borders, message banners or company names and logos from the film manufacturer. These stylized designs can be positioned along any border of a frame or a combination of borders by the manufacturer. The manufacturer pre-exposes only the portion of the film that will contain the desired image. The remaining portion of the frame of the film is covered by a mask to prevent exposure.

At this point the film is packaged in light-tight containers and sold in conventional lengths, i.e., consisting of twelve, twenty-four or thirty-six exposures. If the camera is disposable or single-use the film is assembled with the camera instead of being sold separately.

The second or target image is later captured on the unexposed portion of the frame much like conventional single exposure photography. The film is then processed in a conventional manner.

In the case of a disposable camera the entire camera with the film inside is sent to the film developer for processing. Thereafter the developer sends the camera without the film for recycling, namely reloading of the camera with new or pre-exposed film. The camera is then reused.

Figure 1:
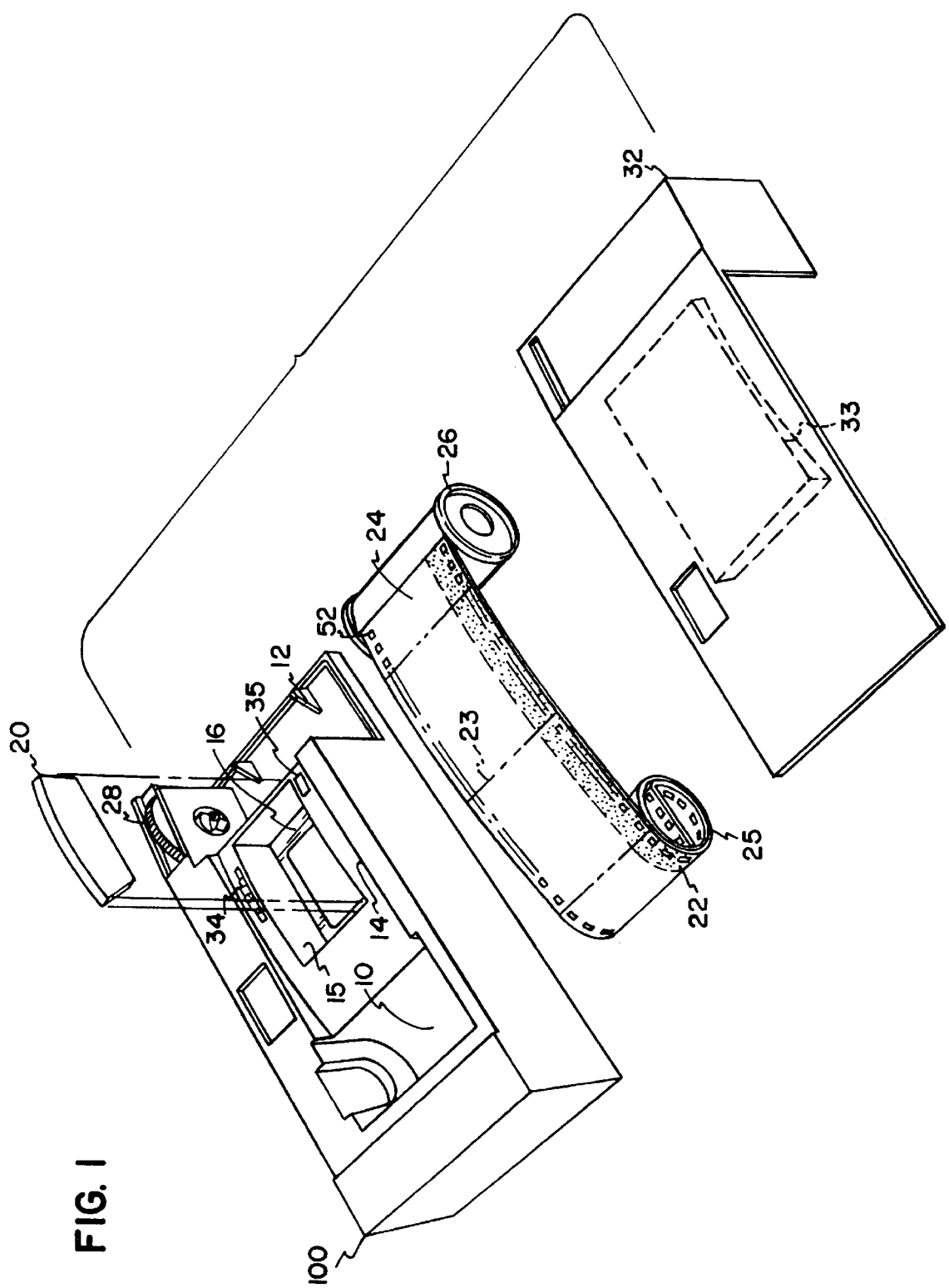
FIG. 1 is an exploded view of a camera, pre-exposed film and an exposure limiting device used in one embodiment of this invention.

FIG. 1 illustrates an exploded view of a camera 100, pre-exposed film 25 and a non-opaque exposure limiting device 20 (see also FIG. 5A) in accordance with one embodiment of this invention. The camera 100 has two cavities 10 and 12 for holding the pre-exposed film 25. One cavity 10 holds the pre-exposed film 25 prior to re-exposure and the other cavity 12 holds the film 25 with a take-up spool 40 (see FIG. 2) in a light-tight cassette 26 after re-exposure. The cavities 10 and 12 are located on opposite sides of the exposure aperture frame 14. The exposure aperture frame 14 surrounds the camera lens 44 (see FIG. 2) through which the light reflected from the target image passes onto the unexposed portion 24 of the pre-exposed film 25. The target image being focused onto the unexposed portion 24 of the film 25 by a lens 44 (see FIG. 2).

The film 25 is a fixed length and, after an exposure, defines a plurality of frames 23. Each frame being of the same size and of fixed length. Perforated holes 52 are located at the top and bottom edges of the film running along the entire length of the film 25. The holes 52 fit onto the sprocket 34 used to advance the film 25.

The film 25 contains a first exposed image on a portion 22 of the film 25 within a space to be formed as part of the frame 23. The portion 24 of the film 25 not containing the first exposed image is the unexposed portion 24 onto which the target image is focused. The film 25 is encased in a light-tight container 26 to prevent re-exposure after the exposure to the first exposed image and before exposure to the target image.

Each frame 23 of the pre-exposed film 25 is aligned with the exposure aperture frame 14 when the pre-exposed film 25 is loaded into the camera 100. The film 25 is aligned with the exposure aperture frame 14 by extending the film 25 across the exposure aperture frame 14 and onto the take-up spool 40 until a cut-out (not shown) in the film is aligned with a fixed mark 35 on the exposure aperture frame 14. In addition to aligning the film 25 with the lens 44, this also aligns the non-opaque exposure limiting device 20 with the pre-exposed portion 22 of the film 25.

The camera 100 includes means for advancing 28 the film 25 whereby the film 25 traverses from the exposure aperture frame 14 to the take-up spool 40 after re-exposure of a frame 23 of the film 25. The means for advancing the film 28 is operatively coupled to a sprocket 34 located on the exposure aperture frame 14. As the means for advancing the film 28 is rotated, the take-up spool 40 and sprocket 34 advance the film 25 while keeping it aligned to the exposure aperture frame 14. The take-up spool 40 is encased in a light-tight container 26 to prevent any subsequent re-exposure.

The non-opaque exposure limiting device 20 is attached at various locations to an opaque support bracket 16. The opaque support bracket 16 is positioned in the area 15 between the lens 44 and the film 25. This area 15 being defined as the exposure aperture housing 15. The installation of the support bracket 16 into the exposure aperture housing 15 effectively reduces the amount of light passing from the lens 44 onto the film 25.

The translucent diffuser 20 only partially reduces the exposure intensity to the pre-exposed area 22 of the film 25 thereby permitting re-exposure of the pre-exposed area 22 of each frame 23 of the film 25. The translucent diffuser 20 can be manufactured to permit varying degrees of re-exposure of the pre-exposed area 22 of the film 25. The amount of re-exposure permitted by the translucent diffuser 20 will depend up the amount required by the pre-exposed image on the film 25 to produce a relatively smoothly blended composite photograph.

The correct diffuser 20 could be selected by the manufacturer of the camera 100 at the time the camera 100 and or film 25 are assembled. Thus, each translucent diffuser 20 will correlate to a specific pre-exposed image.

The camera 100 is sealed in a light-tight manner with a back cover 32. The back cover 32 has a pressure plate 33 that firmly presses the film 25 against the exposure aperture frame 14. This helps to keep the film 25 correctly aligned with the camera lens 44.

Figure 2:
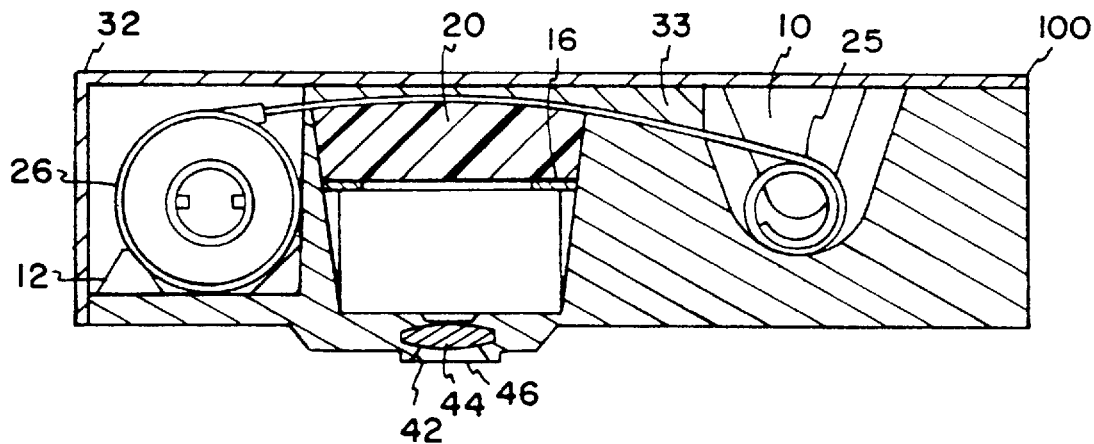
FIG. 2 is a section view taken along line 2—2 of FIG. 3.
Figure 3:
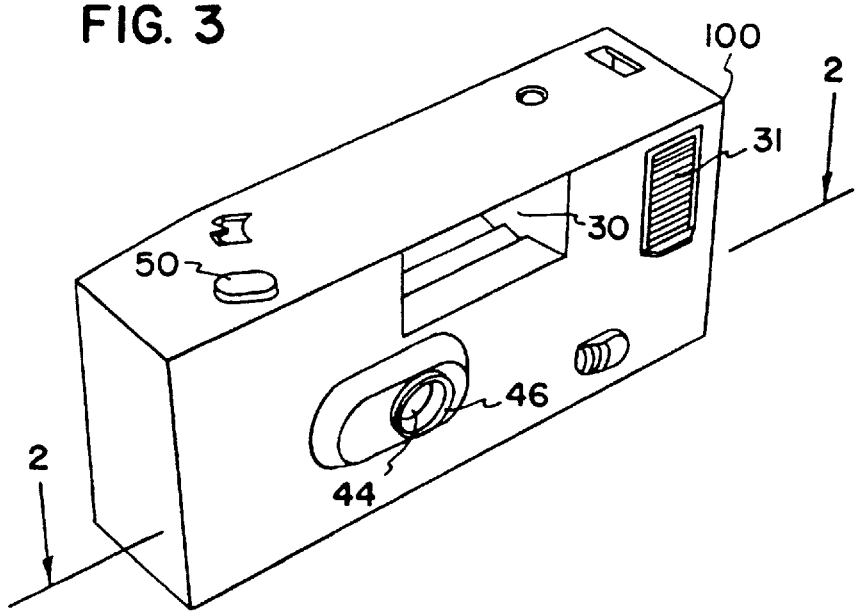
FIG. 3 is a perspective view of a camera used in one embodiment of this invention.

FIG. 2 is a section view of FIG. 3 taken along lines 2—2. The diagrams shows the photography apparatus as it would look when in use. Light reflected from a target image enters the camera 100 at the lens opening 46, passes through the lens 44 which focuses the target image onto the unexposed portion 24 of the film 25. After the light passes through the lens 44 and before the light passes onto the film 25, the opaque support bracket 16 masks out light that would expose areas outside the periphery of each frame 23 of the film 25. Then, the translucent diffuser 20 partially reduces the light only to the pre-exposed portion 22 of the film 25.

FIG. 3 is a perspective view of a camera 100 used in one embodiment of this invention. In addition to the elements described in FIG. 1, the camera 100 includes a viewfinder 30 to allow the user to focus the camera 100 on the target image. The shutter 42 (see FIG. 2) covers the lens 44 in a light-tight manner when the camera 100 is not being used. Upon pressing the shutter control button 50 the shutter uncovers the lens 44 thereby permitting exposure of the target image onto the pre-exposed film 25. The camera 100 also contains a flash 31 when additional light is necessary to illuminate the target image.

Figure 4:
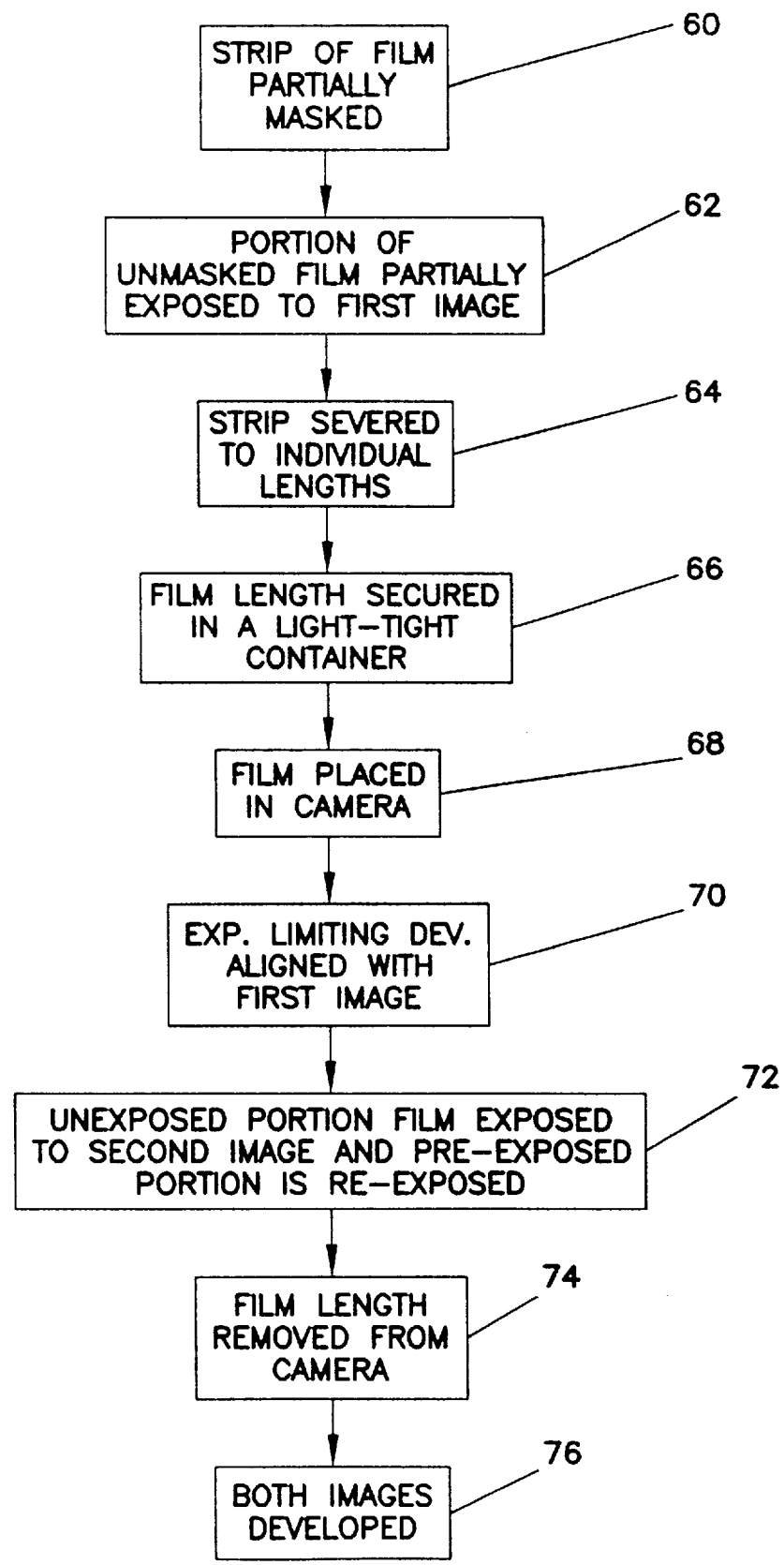
FIG. 4 is a block diagram illustrating the sequence of steps required to produce a smoothly blended composite photograph according to this invention.

FIG. 4 illustrates the sequence of steps required to produce a relatively smoothly blended composite photograph according to this invention. Initially, at 60 the film 25 is partially masked in a light-tight manner by positioning an opaque cover (not shown) between the lens 44 and the portion 24 of the film 25 that will later capture the second or target image. Next, at 62 the unmasked portion 22 of the frame 23 is subjected to a partial exposure of the first image. This process is repeated for each frame 23 of the film 25. At 64, the film 25 is cut into standard lengths i.e., to produce 12, 15, 18, 24, 27 or 36 frames 23 for each length of film 25. At 66, each length of film 25 is then encased in a light-tight container 26 prior to insertion into a camera 100 at 68. The film 25 is loaded into the camera 100 so that at 70, a non-opaque exposure limiting device 20 is positioned between the camera lens 44 and the first image on the film 25. Then at 72, the unexposed portion 24 of the film 25 is exposed to the target image while simultaneously re-exposing the first image. Step 72 is repeated for the length of the film 25 prior to removal at 74. In the case of a disposable camera 100 the film 25 is not removed at 74, instead the camera 100 and film 25 are sent to the developer at 76. At 76, the film 25 is the developed in a conventional manner.

The technique for manufacture of the film is further described in detail as follows with regard to FIG. 9.

A procedure is described for creating the length of film for photographic exposure. This film so produced comprises a first exposed area, and an unexposed area for exposure to create a target image. The unexposed area is the portion of the film not containing the first exposed area thereby to permit the production of film having both the first exposed area and target image.

The procedure for creating the first image of a desired art for the first image uses a computer program. The program alters the contrast levels and tonal gradients of an image represented by the art, and an electronic image is obtained on the film representative of the image represented by the art. A developed transparency film is obtained for being a master for creating repetitions of the image as the first exposed image on a length of film. The master is placed on an optical stand through which the length of film is exposed to the image as the first exposed image.

The image is altered to vary the gamma of emulsion layers from a color tonal & contrast perspective, and an altered image file is transmitted to a high resolution film recorder.

The optical stand includes masking formed to tolerances of the camera and the optical stand includes a light source of a color temperature that falls in the 5,000 to 5800 degree Kelvin scale.

Figure 9:
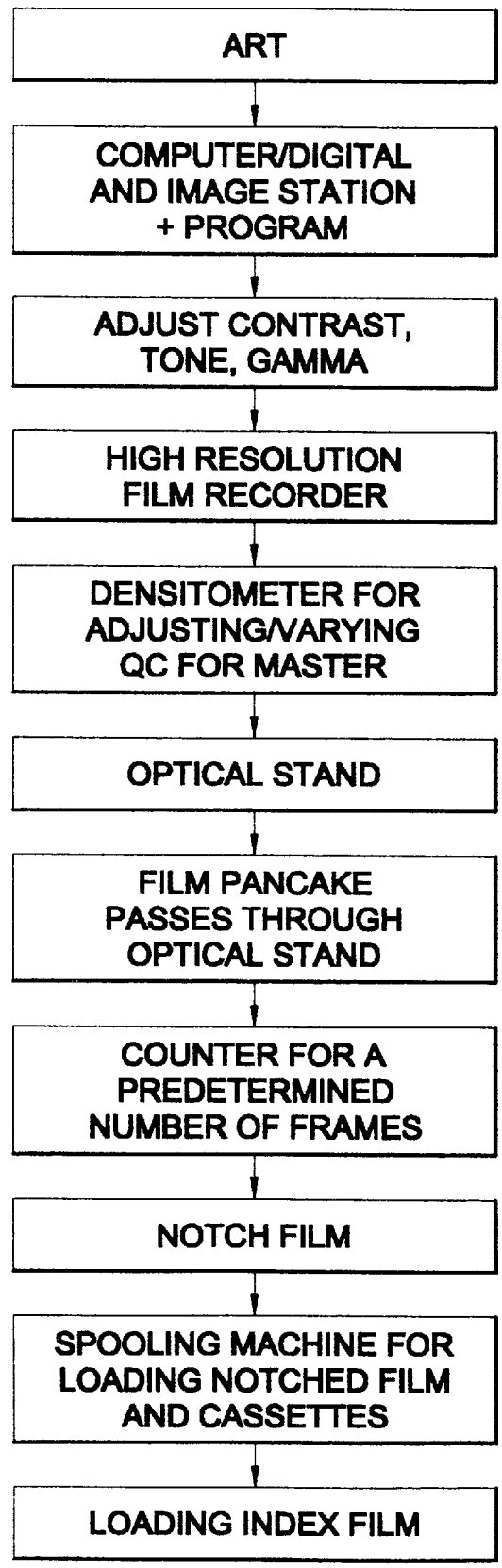
FIG. 9 is a block diagram illustrating the sequence of steps required to produce a film for use to smoothly blended composite photograph according to this invention.

In more detail FIG. 9 illustrates initially the preparation of Art. this can be done by a producer of the film or a customer. The art is placed or scanned in to a computer having a program such as the Adobe Photoshop (TM) program. In that program there is the capabilities to alter the contrast levels and tonal gradients of the image which is representative of the art. Other programs can be used.

This variation includes the ability to vary the gamma of each emulsion layer from a color point of view allows muting of some colors while brightening other. The importance of the numerical values for the magenta cyan and yellow "layers, developed determine the quality of the final image, using this technique. The values will vary for each different situation and art work forming the image.

This ability of variation allows for the production of different and superior product than other techniques. Different values are applied to the image file, and these values relate to the utilization of various tools within the software program. As such the image file is altered to fit the appropriate coloring, tonal and contrast criteria, and it is then sent to a high resolution film recorder. The film recorder is provided with non-default values to give a synergy of the file, the film master, and the final film to be inscribed with the caption, namely the pre-exposed portion of the film.

Thereafter the film has the electronic image written to it. Variations of development times are imparted to further define the quality to the film. The developed film is then read in a densitometer to verify that the image falls into selected criteria to produce an effectively acceptable master image. This developed transparency film now becomes the master for "burning" the rolls of caption (pre-exposed image) film.

The master is placed on an optical stand which includes masks that have been machined to very close tolerances in the camera itself. The light source is of a color temperature that falls in the 5,000 to 5800 degree Kelvin scale. The time and quantity (f stop) of the exposure is set so that when that is combined with the contrast of the master this can produce the proper contrast range of the caption to work with the opaque or non-opaque insert as the case may be.

Next a pancake of film is place in the modified optical stand and is then exposed to the master. The film is exposed utilizing an electronic counter, and a predetermined number of frames are exposed. After the correct number is exposed, the film is notched. For example a 24 exposure camera would require approximately 31 frames of film. This notching technique is very accurately performed, as the later indexing is dependent on the accuracy of this notching.

The film is then placed in a spooling machine and the film is placed in a 35 MM cassette. The spooling machine knows the proper time to cut the film by reading the notch. The cassette is placed in a disposable 35 MM camera and is indexed by using the same notch that was used in the spooling procedure.

Figure 5A:
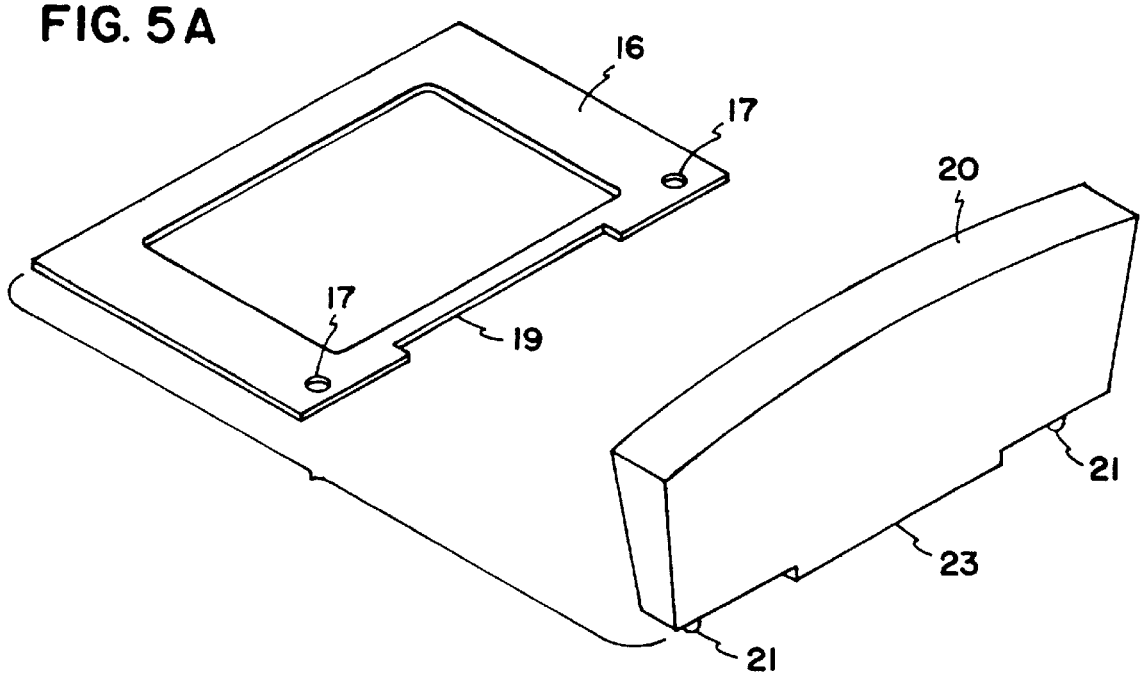
FIG. 5A is an exploded view of the exposure limiting device.

FIG. 5A is an exploded view of the exposure limiting device 20 and the support bracket 16. The support bracket 16 has a combination of spaced-out pin holes 17 and cut-outs 19 that correspond to pegs 21 and teeth 23 at the narrow end 27 of the translucent diffuser 20 to secure the bracket 16 and diffuser 20 together.

The translucent diffuser 20 is wedge shaped and attaches to the support bracket 16 by means of a friction fit between the pin holes 17 and cut-outs 19 of the support bracket 16 with the pegs 21 and teeth 23 at the narrow end 27 of the diffuser 20. When the diffuser 20 is affixed to the support bracket 16, the wide end 29 of the diffuser 20 is adjacent to the film 25 and covers the pre-exposed area 22 of the film 25.

Figure 5B:
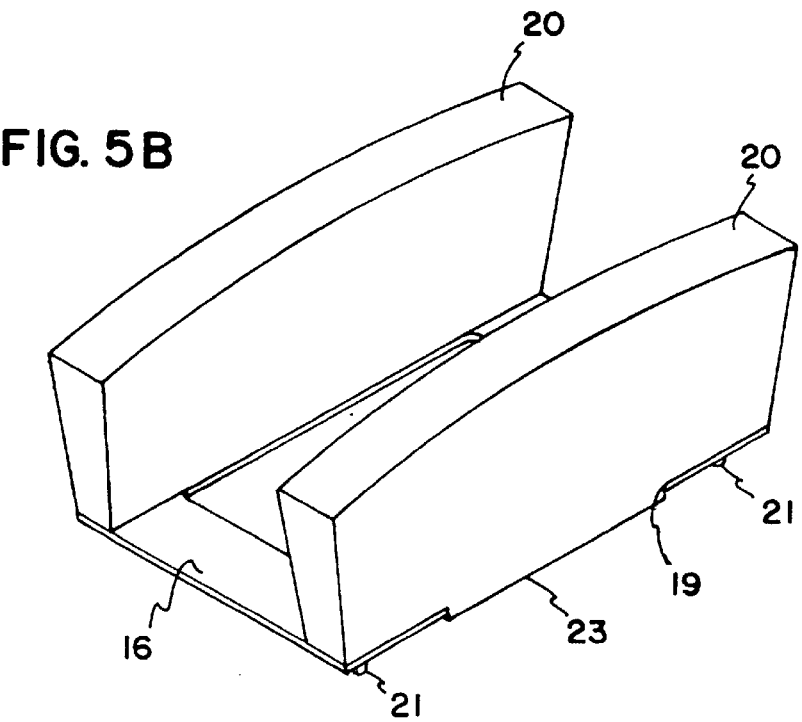
FIG. 5B is a perspective view of the exposure limiting device with multiple translucent diffusers.
Figure 8A:
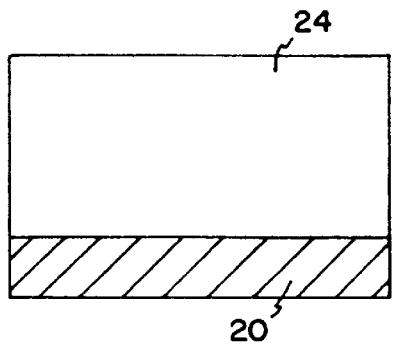
FIG. 8 is a block diagram of various exposure limiting devices of different sizes and shapes.
Figure 8B:
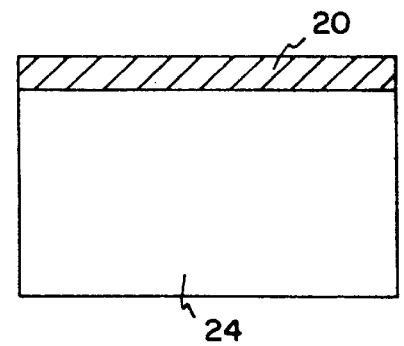
Figure 8C:
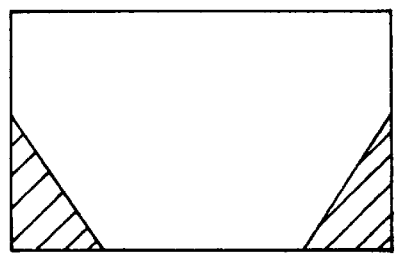
Figure 8D:
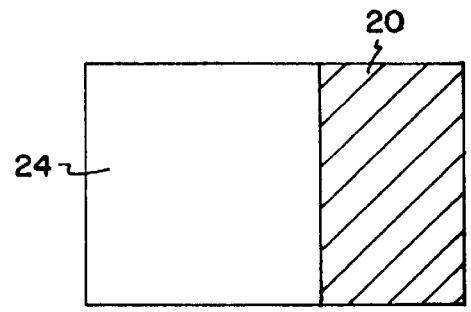
Figure 8E:
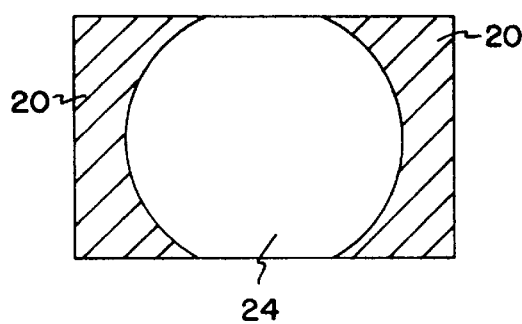
Figure 8F:
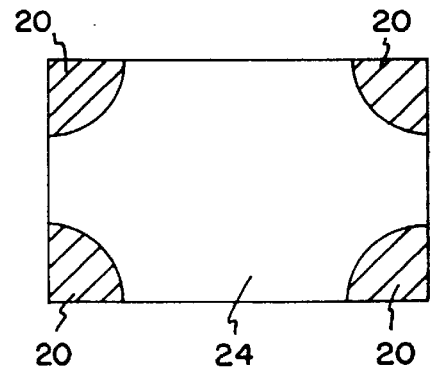

FIG. 5B is a perspective view of the exposure limiting device with multiple translucent diffusers 20. Each translucent diffuser 20 is attached to the same support bracket 16. The diffusers 20 are attached to the support bracket 16 by fitting the spaced-out pin holes 17 and cut-outs 19 on the support bracket 16 with the pegs 21 and teeth 23 on the diffusers 20 in the same manner described in FIG. 5A.

FIG. 6A is block diagram illustrating the blending effect of the exposure limiting device 20. In this arrangement the exposure limiting device 20 overlaps not only the pre-exposed area 22 of the film 25, but also covers part of the unexposed area 24. This creates a substantially smooth blend between the two images by creating a zone of overlap 122 (see FIG. 7A). The zone of overlap 122 washes out any visible demarcation between the two images.

FIG. 6B is block diagram illustrating another use of the exposure limiting device 20 to create a relatively smooth blending effect. The boundary 124 (see FIG. 7B) where the two images meet is washed out by only partially masking out the light. As the distance from the boundary of the two images 124 to the bottom edge of the film 25 increases, the exposure limiting device 20 becomes stronger because of its wedge shape.

The wedge shape of the diffuser creates a wash-out effect by incrementally decreasing the intensity of the exposure at the boundary 124 to the bottom of the pre-exposed area 24 of the film 25. This design results in a relatively smooth blending of images. This effect is not possible with the masking described in the prior art. Masking does not allow re-exposure of the pre-exposed area 24 or varying the degree of re-exposure the pre-exposed area 24 receives.

FIG. 8 is a block diagram of various exposure limiting devices 20 of different sizes and shapes. The translucent diffuser 20 may also be partly non-opaque and partly opaque to correspond to the desired amount of re-exposure required for the first image. The translucent diffuser 20 may also be embodied in shapes other than a wedge. For example, the diffuser 20 can be rectangular (see FIG. 8A, 8B and 8D), curved (see FIG. 8F), diagonal positioned across the corners (see FIG. 8C), circular (see FIG. 8E), or any number of shapes that may cover only a portion of the total area comprising the frame.

This invention may be embodied in any number of variations other than the ones described. For instance, there may be more than one area pre-exposed before the second exposure is effected. Thus, one pre-exposure could be at the top of the film, and a second pre-exposure may be at the sides or bottom of the film.

This invention includes recent advances with cameras and film known as "Advanced Photo System" (trademark). Such systems, such as the KODAK ADVANTix System (trademark), include a camera and film capable of storing and reading photographic information to and from the film. The photographic information can be used for determining whether a particular frame of the film has been exposed as well as desired picture size. The film has the ability within its composition and structure, together with a camera having the appropriate sensors and other features, to determine alignment with the exposure aperture frame. Examples of camera and film incorporating Advanced Photo System (trademark) technology include the KODAK ADVANTiX (trademark) 4100 IX Zoom Camera and the KODAK ADVANTiX (trademark) 100, 200 or 400 film as well as cameras and film from other manufacturers such as Fuji and AFGAR.

This invention also extends to other methods of recording first exposed images or captions on the film such as through use of electronic means including digital computers and engraving. Using electronic means such as digital computers images can be generated on a computer before being recorded onto the film. This allows for a great variety of images to be produced on the film as well as producing a high quality image.

The invention herein encompasses other embodiments of the non-opaque exposure limiting device where the support bracket and the translucent diffuser are manufactured as a single piece or affixed together by other means.

The non-opaque exposure limiting device may include only one of the two components, either the supporting bracket or the translucent diffuser. If the supporting bracket is itself the exposure limiting device it would be translucent thereby permitting re-exposure of the first image. If the translucent diffuser is itself the exposure limiting device it may be affixed directly to the exposure aperture housing or manufactured as part of the exposure aperture frame or housing.

The translucent diffuser can be manufactured to permit varying degrees of light to pass to the first image. The diffuser can reduce the light intensity between about one and two fStop depending upon its density.

The translucent diffuser can be manufactured from a variety of materials in the nature of acrylic which might include plexiglass.

The exposure limiting device and film can be integrated in any number of ways. The exposure limiting device can be part of the film itself when added as a top layer of the film or as part of a film cassette for use in ready-to-use cameras, e.g., using 110 or 126 type film cassettes. The critical elements being the position of the exposure limiting device between the film and the lens and the use of the exposure limiting device to re-expose the pre-exposed area of the film.

Various means for aligning the pre-exposed frame with the exposure aperture frame within the scope of this invention include but are not limited to alignment at the time the film is loaded into the camera. This is accomplished by aligning a mark fixed on the exposure aperture frame with a mark on the film. Alignment can also be done during assembly of the camera and the film.

Means for advancing the film include, but are not limited to battery powered mechanisms, manual mechanisms or a combination of the two.

Many other forms of the invention exist each differing in matters of detail only. For instance although the camera system has been described largely with regard to a non-opaque element there is also a system where the exposure limiting device is an opaque element for reducing light intensity. The film producing technique can be used with the system whether or not the element is opaque or non-opaque.

While certain preferred embodiments of the present invention have been disclosed in detail, it is to be understood

What is claimed:

1. A method of creating a length of film for photographic exposure comprising perforated holes located on an the edge of the film and running along length of the film, a first exposed image contained on an area of the film within a space to be formed as a frame on the film, an unexposed area of each frame of the film being the portion of the film not containing the first exposed image; the first exposed area being for re-exposure under a partially reduced exposure intensity thereby permitting re-exposure of the first exposed area on each frame when a target image is exposed to the unexposed portion of the frames of the film comprising the steps of forming from a desired art for the first image an electronic image in a computer program, the program being for altering the image represented by the art, creating from the altered electronic image a developed transparency film for being a master image for creating repetitions of the image as the first exposed image on a length of film, and subjecting the master to an exposure process through which the length of film is exposed to the master image as the first exposed image.

2. A method as claimed in claim 1 wherein the film is for use in photography, the film having the ability within its composition and structure, together with a camera having sensors for determining alignment with the exposure aperture frame.

3. A method as claimed in claim 1 wherein the film is for use in a disposable camera.

4. A method as claimed in claim 1 wherein the film is for use in a pre-assembled format in a camera.

5. A method of creating a film comprising a fixed length for photographic exposure comprising a first exposed image contained on an area of the film within a space to be formed as a frame on the film, such image being for re-exposure in a camera, and an unexposed area for each frame of the film being the portion of the film not containing the first exposed image and comprising the steps of:

forming from a desired art for the first image a electronic image in a computer program, the program being for altering the image represented by the art, creating from the altered electronic image a developed transparency film for being a master for creating repetitions of the image as the first exposed image on a length of film, and subjecting the master to an exposure process through which the length of film is exposed to the image as the first exposed image.

6. A method as claimed in claim 5 wherein the film is for use in photography, the film having the ability within its composition and structure, together with a camera having sensors for determining alignment with the exposure aperture frame.

7. A method as claimed in claim 5 wherein the film is for use in a disposable camera.

8. A camera comprising:

an exposure aperture frame, means for aligning a film with the exposure aperture frame for exposure to a target image on the film, the target image being focused by a lens onto an unexposed portion of the film; and an exposure intensity reducing element for location relative to a first exposed image on a first exposed area of the film thereby permitting re-exposure of the first exposed area when the target image is exposed to the unexposed portion of the film and wherein a desired art for the first image is formed in a computer program thereby obtaining an electronic image representative of the art, the program being for altering the image representative the art, creating from the image a developed transparency film for being a master for creating repetitions of the image as the first exposed image on a length of film, and subjecting the master to an exposure process through which the film is exposed to the image as the first exposed image.

9. A camera as claimed in claim 8 wherein the camera is disposable.

10. A camera as claimed in claim 8 when the camera is loaded with a roll of the film.

11. A single use camera comprising:

a length of pre-exposed film for photographic exposure, the film having a first exposed area and an unexposed area for exposure to a target image, the unexposed area being the portion of the film not containing the first exposed area;

means for holding the pre-exposed film prior to re-exposure, an exposure aperture fame across which the film is positioned for exposure to the target image, the target image being focused by a lens onto the film; and an exposure intensity reducing element for location relative to the first exposed area on the film for reducing an exposure intensity to the first exposed area on the film such that the pre-exposed image and the target image are blended so that there is no separate visible line of demarcation between the images.

12. A length of film for photographic exposure comprising a first exposed area, and an unexposed area for exposure to a target image, the unexposed area being the portion of the film not containing the first exposed area, and wherein the first exposed area on the film has been pre-exposed under selected exposure characteristics such that when the target image is exposed to the unexposed portion of the film in a single use camera having an exposure intensity reducing element in the camera for location relative to the first exposed area on the film, there is reduced exposure intensity to the first exposed area on the film and there is thereby obtained a film having both the first exposed area and the target image, and wherein the first exposed image is blended with the target image such that there is no separate visible line of demarcation between the images.

13. A film as claimed in claim 12 for use in a disposable camera.

14. A film as claimed in claim 12 for use in a pre-assembled format in a camera.

15. A length of film for photographic exposure comprising a first exposed area to have a first image, and an unexposed area for exposure to a target image, the unexposed area being the portion of the film not containing the first image thereby having a film with both the first image and the target image, and the first exposed image having been exposed under a selected exposure characteristics, such that in use in a disposable camera having an exposure intensity reducing element in the camera for location relative to the first exposed area on the film, further exposure of the first exposed area is reduced in an exposure intensity such that the first image and the target image are relatively blended together and there is no separate visible line of demarcation between the images.

16. A film as claimed in claim 15 for use in a disposable camera.

17. A film as claimed in claim 15 for use in a pre-assembled format in a camera.

18. A length of film for photographic exposure comprising perforated holes located on an the edge of the film and running along length of the film, a first exposed image contained on an area of the film within a space to be formed as a frame on the film, an unexposed area of each frame of the film being the portion of the film not containing the first image, and wherein a desired art for the first image is formed as an electronic image in a computer program, the program being for altering the electronic image representing the art, creating from the electronic image a developed transparency film having the first exposed image on a length of film, and the first image being established with selected exposure characteristics such that the first image and a target image created by exposure of the unexposed area in a camera are relatively blended together.

19. A film as claimed in claim 18 for use in a disposable camera.

20. A film as claimed in claim 18 for use in a pre-assembled format in a camera.

21. A length of film that is claimed in claim 18, wherein blending is effected so that there is essentially no separate visible line of demarcation between the first exposed image and the target image.

22. A camera comprising:
  a film, the film having a first exposed area and an unexposed area for exposure to a target image, the unexposed area being a portion of the film not containing the first exposed area;
  an exposure aperture frame, means for aligning the film with the exposure aperture frame for exposure to the target image, the target image being focused by a lens onto the unexposed portion of the film;
  an exposure intensity reducing element for location relative to the first exposed image on the first exposed area of the film, a desired art for the first image having been formed as an electronic image in a computer program, the program being for altering the electronic image representing the art, and thereby obtaining an altered image on the film representative of the image representative of the art, and thereby creating from the altered electronic image, the film with the first exposed image;
  The exposure intensity reducing element being related to the first exposed area when the target image is exposed to the unexposed portion of the film, such that a blended representation of the first exposed image and the target image is created;
  means for holding the film prior to exposure to he target image and for holding the film after exposure to the target image; and
  means for advancing the film whereby the film departs from the exposure aperture frame after exposure to the target image.

23. A camera as claimed in claim 22 wherein the camera is disposable, and the blending is such that there is no separate visible line of demarcation between the first exposed image and the target image.

24. A method of forming a length of film for photographic exposure comprising the steps of:
  creating a first exposed area, and an unexposed area for exposure to a target image, the area being the portion of the film not containing the first exposed area thereby to permit the production of film having both a first exposed image and a target image;
  forming a desired art for the first image;
  obtaining an electronic image in a computer program, the electronic image being representative of the first image represented by the art;
  manipulating through the program the electronic image relative to the first image represented by the art;
  creating from the manipulated electronic image a developed transparency film for being a master image for creating repetitions of the manipulated electronic image as the first exposed image on a length of film; and
  subjecting the master image to an exposure process through which a length of film is exposed to the master image as to become the first exposed image.

25. A method as claimed in claim 24 wherein the manipulated first image is transmitted to a high resolution film recorder.

26. A method as claimed in claim 25 wherein default values of the film recorder are modified to provide a synergy of the file, the film master, and the final film to be inscribed with the first exposed image.

27. A method as claimed in claim 24 wherein the exposure process includes a masking step formed to tolerances of a camera intended to receive the length of film.

28. A method as claimed in claim 24 wherein the film is for use in photography, the film having the ability within its composition and structure, together with a camera having sensors for determining alignment with the exposure aperture frame.

29. A method as claimed in claim 24 wherein the film is for use in a disposable camera.

30. A method as claimed in claim 24 wherein the film is for use in a pre-assembled format in a camera.

31. A method as claimed in claim 24 including rolling the film on a reel.

32. A method of forming a length of film for photographic exposure comprising the steps of:
  creating a first exposed area, and an unexposed area for exposure to a target image, the unexposed area being the portion of the film not containing the first exposed area thereby to permit the production of film having both a first exposed image and a target image;
  forming a desired art for the first image;
  obtaining an electronic image in a computer program, the electronic image being representative of the first image represented by the art;
  manipulating through the program the electronic image relative to the first image represented by the art;
  creating from the manipulated electronic image a developed transparency film for being a master for creating repetitions of the image as the first exposed image on a length of film;
  sending the manipulated image as the master to a high resolution film recorder; and
  subjecting the master image from the recorder to an exposure process through which a length of film is exposed to the master image as to become the first exposed image.

33. A method as claimed in claim 32 wherein default values of the film recorder are modified to provide a synergy of the file, the film master, and the final film to be inscribed with the first exposed image.

34. A length of film as claimed in claim 32 wherein the exposure process includes masking formed to tolerances of a camera intended to receive the length of film.

35. A method as claimed in claim 32 wherein the film is for use in photography, the film having the ability within its composition and structure, together with a camera having sensors for determining alignment with the exposure aperture frame.

36. A method as claimed in claim 32 wherein the film is for use in a disposable camera.

37. A method as claimed in claim 32 wherein the film is for use in a pre-assembled format in a camera.

38. A method as claimed in claim 32 including rolling the film on a reel.

* * * * *